(12) United States Patent
England et al.

(10) Patent No.: US 7,421,579 B2
(45) Date of Patent: Sep. 2, 2008

(54) MULTIPLEXING A SECURE COUNTER TO IMPLEMENT SECOND LEVEL SECURE COUNTERS

(75) Inventors: Paul England, Bellevue, WA (US); Marcus Peinado, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1070 days.

(21) Appl. No.: 10/185,506

(22) Filed: Jun. 28, 2002

(65) Prior Publication Data
US 2004/0003244 A1 Jan. 1, 2004

(51) Int. Cl.
*H04L 9/00* (2006.01)
*G06F 11/30* (2006.01)
*H04L 9/32* (2006.01)
*H04K 1/00* (2006.01)

(52) U.S. Cl. .................... 713/168; 713/187; 713/189; 726/26; 726/27; 726/28; 726/29; 726/30; 726/31; 726/32; 380/201; 705/50; 705/51; 705/52

(58) Field of Classification Search .............. 713/185, 713/187, 189, 168; 726/26–32; 380/201; 705/50–52
See application file for complete search history.

(56) References Cited

U.S. PATENT DOCUMENTS

| | | | | |
|---|---|---|---|---|
| 5,386,369 A | * | 1/1995 | Christiano | 705/400 |
| 5,892,900 A | | 4/1999 | Ginter et al. | 395/186 |
| 6,219,656 B1 | * | 4/2001 | Cain et al. | 705/412 |
| 6,301,660 B1 | * | 10/2001 | Benson | 713/165 |
| 6,442,691 B1 | * | 8/2002 | Blandford | 713/178 |
| 6,510,513 B1 | * | 1/2003 | Danieli | 713/156 |
| 6,820,063 B1 | * | 11/2004 | England et al. | 705/54 |
| 6,865,675 B1 | * | 3/2005 | Epstein | 713/176 |
| 2002/0019813 A1 | | 2/2002 | Furuya | 705/52 |
| 2002/0107806 A1 | * | 8/2002 | Higashi et al. | 705/51 |
| 2002/0152393 A1 | * | 10/2002 | Thoma et al. | 713/189 |
| 2002/0169974 A1 | * | 11/2002 | McKune | 713/200 |
| 2003/0041243 A1 | * | 2/2003 | Olguin et al. | 713/172 |

(Continued)

FOREIGN PATENT DOCUMENTS

DE 198 21 696 A1 11/1999

(Continued)

OTHER PUBLICATIONS

IBM Response to DVB-CPT Call for Proposals for Content Protection & Copy Management: χCP Cluster Protocol, *χCP Cluster Protocol DVB-CPT-716*, 2001, International Business Machines, 1-32 (Pertinent page #20).

*Primary Examiner*—Ayaz Sheikh
*Assistant Examiner*—Trang Doan
(74) *Attorney, Agent, or Firm*—Woodcock Washburn LLP (57) ABSTRACT

A multiplexed secure counter is provided, in which a multiplicity of child secure counters are secured by a parent secure counter. Child counters are stored with a parent secure counter value and a signature. Before a child counter is read, the signature is verified and value stored is checked against the current value of the parent secure value. If the verifications are successful, the child secure counter can be used. To increment a child counter, the signature is verified and the value stored checked against the current value of the parent secure value. If the verifications are successful, the parent counter and the child counter are incremented, and the data is signed again.

24 Claims, 4 Drawing Sheets

U.S. PATENT DOCUMENTS

| | | | |
|---|---|---|---|
| 2003/0046658 A1* | 3/2003 | Raghavan et al. | 717/106 |
| 2003/0088783 A1* | 5/2003 | DiPierro | 713/189 |
| 2003/0191719 A1* | 10/2003 | Ginter et al. | 705/54 |

FOREIGN PATENT DOCUMENTS

| | | |
|---|---|---|
| EP | 0 679 977 A1 | 11/1995 |
| WO | WO 00/04727 | 1/2000 |
| WO | WO 01/69352 | 9/2001 |
| WO | WO 0169352 A1 * | 9/2001 |

* cited by examiner

MULTIPLEXING A SECURE COUNTER TO IMPLEMENT SECOND LEVEL SECURE COUNTERS

FIELD OF THE INVENTION

The present invention relates to counters, and more specifically, to the use of a secure counter in such a way as to implement second-level secure counters.

BACKGROUND OF THE INVENTION

Computers systems usually include persistent storage. Persistent storage is storage where contents are preserved even when no power is supplied to the storage. Magnetic storage is normally non-volatile by nature, whereas semiconductor memories (e.g. dynamic and static RAM) are normally volatile.

Persistent storage may be used for maintaining state information. For example, in a rights management application that controls rights to audio material, state information may include information about how many times a user may listen to a certain audio file. When a use has occurred, the state information regarding the number of uses will be changed by the rights management application. The state information is maintained even when the rights management application is not running or inactive, and when the computer system is off. Other contexts similarly use state information to store information in a persistent way.

Since state information may store sensitive data, such information must be protected from an adversary who may wish to change the data. An adversary in the rights management context, for example, may wish to change the state information to grant unlimited use of the audio file.

One way to secure the state information is through the use of encryption. If a trusted party signs the state information each time it is changed, no change can occur in the state information without being detected. Before the use of the state information, it can be checked to make sure that it has been signed by the trusted party.

A problem with this is the problem of rollback. An adversary may save a version of the signed state information and, after the signed state information has been replaced with a newer version, the adversary may remove the newer version and replace it with the saved older version. In the digital rights example, the adversary may replace state information indicating no plays As remain for the user of the audio file with older state information indicating that some plays remain. In this way, the adversary may gain access to the content.

In order to prevent the rollback problem, a secure counter may be used. A secure counter is a counter that holds data (a counter value) securely, so that no adversary can change the data, and which can perform two operations on request. The secure counter can report on the counter value, and the secure counter can increment the counter value. Because operations on the counter are limited to these operations, the security of the counter is more easily ensured. If there is no way for a user or a computer system containing a secure counter to, for example, set a counter to a specific value, then an adversary will generally not be able to do so either.

To secure state information using a secure counter, when state information is signed, the counter value is incremented, and a copy of the counter value is appended to the state information and signed. Before state information is used, in addition to verifying the signature, the current counter value is checked and compared to the counter value appended to the state information and signed. The data is only used if the signature is verified and the appended counter value matches the current counter value. In this way, rollbacks can be prevented and security enhanced.

This rollback prevention method requires a secure counter for each piece of data that is being secured. When the counter is used to secure a first piece of data, the counter value is appended to that data and signed. In order to check the security of the data, the signature is verified and the counter value is checked against the actual present value of the counter. If a second piece of data is also secured using that same counter, then any modification of the first piece of data, which will entail a counter increment, will cause the verification of the second piece of data to fail, since the counter value stored with the second data will no longer be equal to the present value of the counter.

One possible solution is to implement in hardware a secure counter for each piece of data to be secured. However, this is obviously costly in terms of hardware. Additionally, increasing the number of secure counters may increase the complexity of the implementation of secure counters in hardware, and this increased complexity may introduce opportunities for security to be thwarted.

Thus, there is a need for a method to provide security for more than one set of data without using a proliferation of hardware secure counters that properly addresses and satisfies heretofore unfilled needs in the art.

SUMMARY OF THE INVENTION

In view of the foregoing, the present invention provides systems and methods for a multiplexed secure counter, which allows the creation of a multiplicity of child secure counters from one existing parent secure counter. A value for each of the child secure counters is stored together with the value of the parent secure counter. The two values are then signed by a trusted entity. A number of child secure counters may be stored together. For example, all of the child secure counter values and the value of the parent secure counter may be concatenated together, and a signature for this concatenation may be created.

In order to read a value for a child secure counter, the signature is verified and the value stored for the parent secure counter is checked against the actual value in the parent secure counter. If the verification is successful and the value stored for the parent secure counter is equal to the actual value of the parent secure counter, the value for the child secure counter is presumed to be authentic and not a "rolled back" value.

In order to increment a value for one specific child secure counter, the value for that specific child secure counter is incremented, as is the value for the parent secure counter. The new value for the specific child secure counter is stored with the new value for the parent secure counter and signed by the trusted entity. All other child secure counter values must also be stored with the new value for the parent secure counter and signed by the trusted entity.

In this way, a multiplicity of secure counters are provided securely and without the hardware overhead that would be necessitated to provide multiple secure counters separately.

Other features of the invention are described below.

BRIEF DESCRIPTION OF THE DRAWINGS

The system and methods for implementing a multiplexed secure counter in accordance with the present invention are further described with reference to the accompanying drawings in which.

DETAILED DESCRIPTION OF THE INVENTION

Overview

Given a first secure counter, additional secure counters ("child" or "second-level" secure counters) are provided. The value to be used for each child secure counter is stored together with the value read from the first ("parent" or "first-level" or "base") secure counter. This value is signed by a trusted entity.

In order to read the value for one of the child secure counters, the signature must be verified and the stored value for the parent secure counter compared to the actual value of parent secure counter. If the signature can be verified and the stored value for the parent counter matches the actual value of the parent counter, the value read for the child secure counter can be used.

In order to change the value for one of the child secure counters, signature must be verified and the parent counter stored must be checked. Once this occurs successfully, the parent counter is incremented. The new value for the child secure counter is stored with the values for any other child secure counter and with the new parent counter value and the values are signed.

Exemplary Computing Environment

Figure 1:
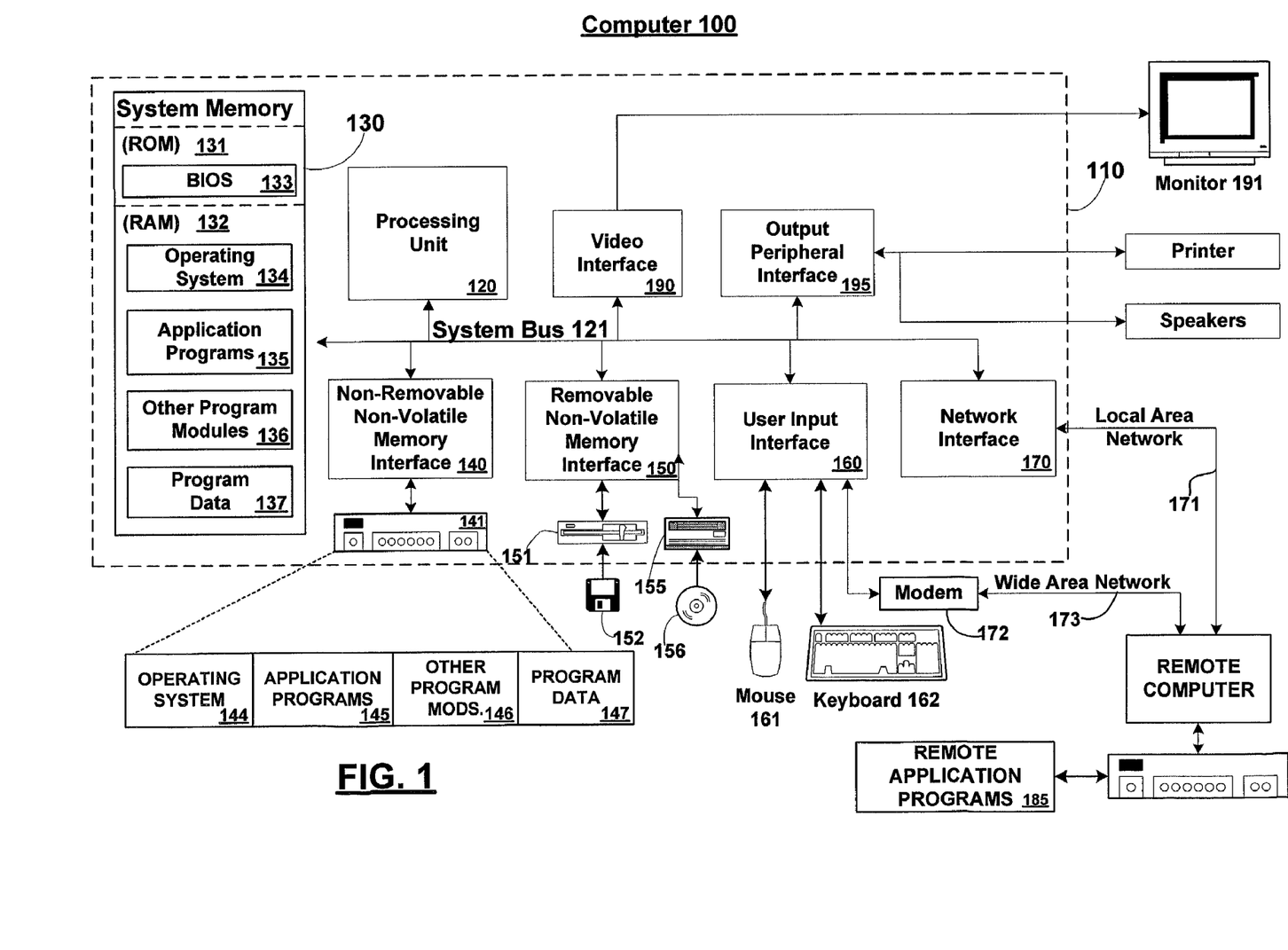
FIG. 1 is a block diagram of an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes, which may be used in connection with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices. Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may utilize the techniques of the present invention.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium that can be used to store the desired information and that can accessed by computer 110. Communication media typically embodies computer readable In instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Implementing Multiplexed Secure Counters

According to one embodiment of the invention, a parent secure counter is multiplexed to provide at least one child secure counter. The parent secure counter comprises memory which holds a value securely and accepts read and increment commands. The read command causes the parent secure counter to return the value stored in the memory. The increment command causes the parent secure counter to increment the value stored in memory.

In a preferred embodiment, incrementing a counter (either a parent or a child secure counter) adds one to the previous value of the counter. However, in alternate embodiments, an increment may change the value of the counter in other ways. In order for the secure counter to be useful, successive new values of the counter must be unique or, at least, rare. Otherwise, when a stored counter value is checked against the current counter value they may match, even though a rollback or other tampering may have occurred.

Figure 2:
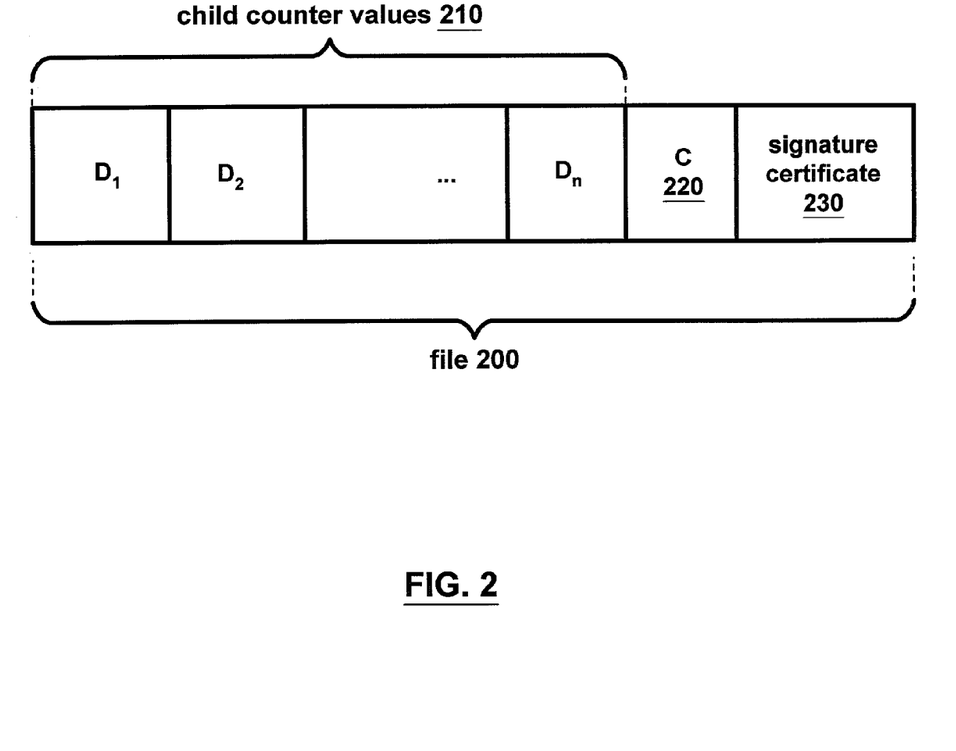
FIG. 2 is a block diagram showing a counter file according to one embodiment of the invention.

As shown in FIG. 2, according one embodiment of the present invention, in a file 200, child counter values $D_1$ through $D_n$ 210 are stored along with parent counter value C 220. The child counter values 210 and the parent counter value C 220 is signed by a trusted entity and a signature certificate 230 is included. According to other embodiments of the invention, file 200 to may have a different format. A number of files may be used, each storing one or more child counter values, parent counter value, and signature. In one embodiment, a separate file exists for each child counter value.

In a preferred embodiment, two operations can be performed on the child secure counters: (1) the value of the child secure counter can be verified, and (2) the value of the child secure counter can be incremented. In one embodiment, these operations are performed through a request to the trusted entity, which may be implemented by hardware or software. In order for security to be maintained, the signature of the trusted entity must be secure and the parent counter must be secure. The file 200 containing the counter values, however, need not be stored securely. If the file is altered, the alteration can be detected by checking the signature. A rollback attempt may be attempted, where a previous version of the file is substituted by an adversary for the current version of the file. In this case, the signature will verify but the parent counter value will not match the stored parent counter value, and so this rollback can be detected.

Reading a Child Counter

Figure 3:
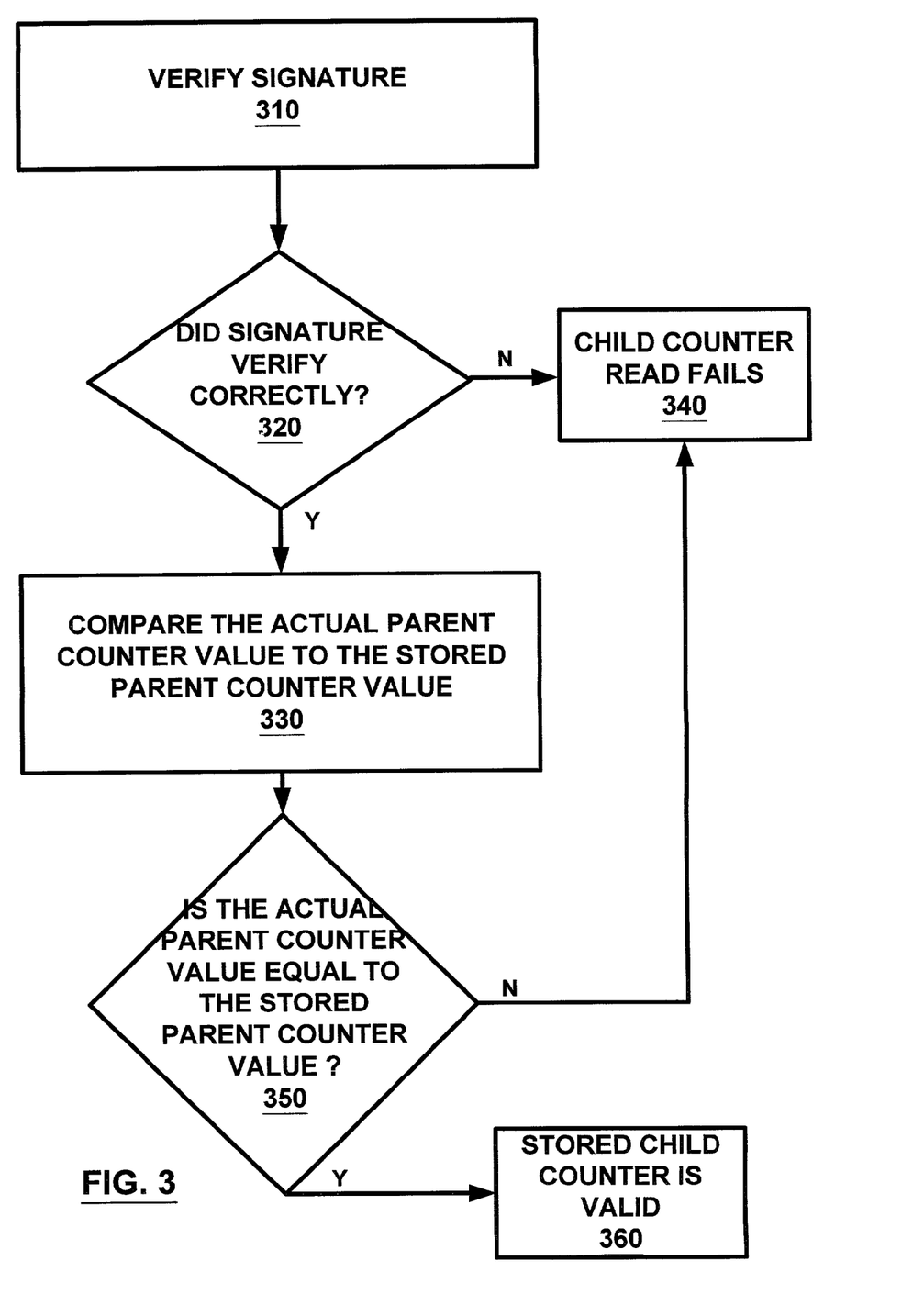
FIG. 3 is a flow diagram showing the use of the multiplexed counter to read a child counter value according to one embodiment of the invention.

In order to read a child counter $D_m$, as shown in FIG. 3, the signature must be verified 310. If the signature is verified successfully 320, the actual parent counter value is compared to the stored parent counter value 330. If the signature is not verified successfully, the child counter read fails 340. If the actual parent counter value is equal to the stored counter value 350, then the stored child counter value $D_m$ is valid 360. If the actual parent counter value is not equal to the stored parent counter value, then the child counter read fails 340.

In other embodiments, signature check 310 is performed after or concurrently with the parent counter value check 330.

Incrementing a Child Counter

Figure 4:
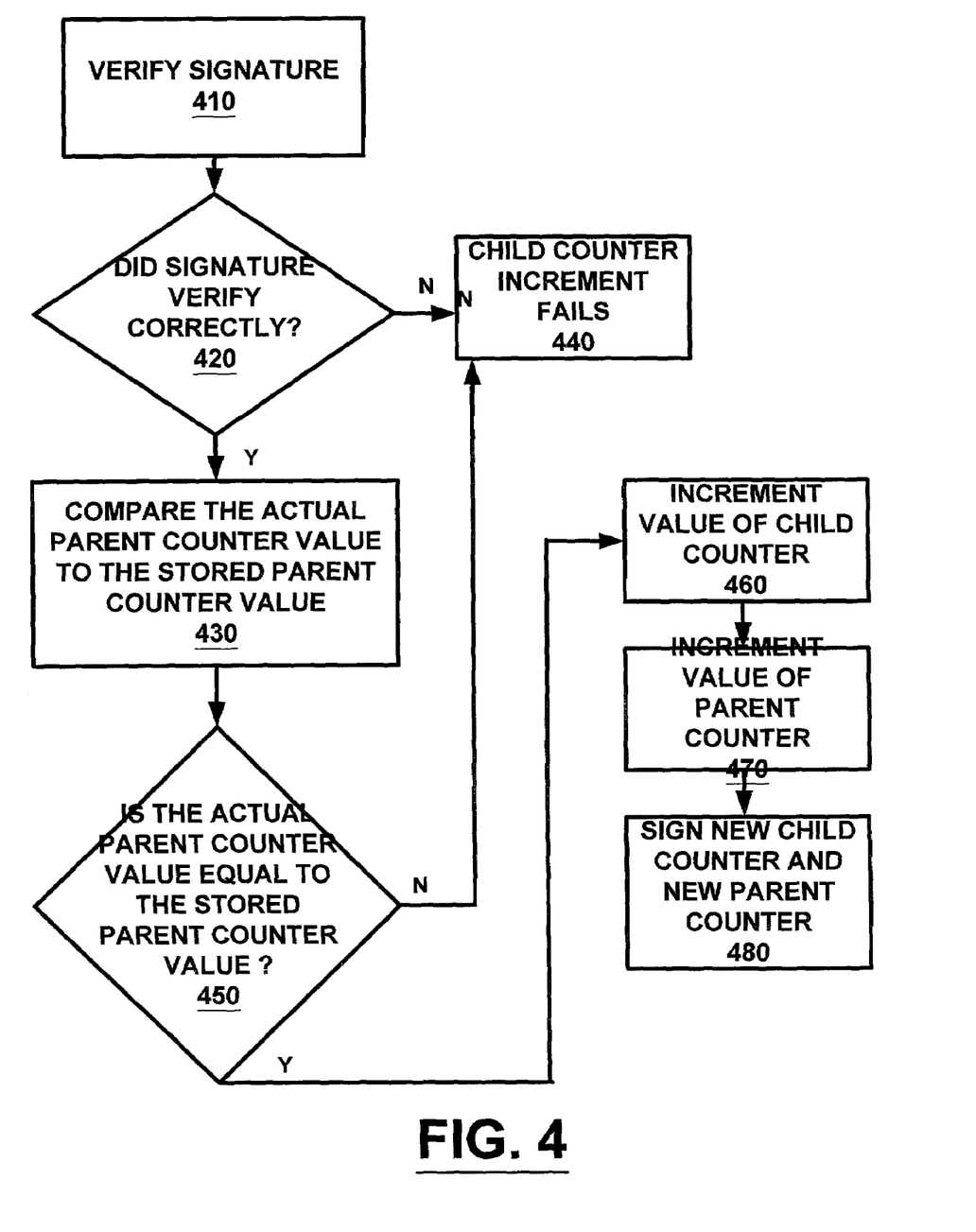
FIG. 4 is a flow diagram showing the use of the multiplexed counter to increment the counter value in a child counter according to one embodiment of the invention.

In order to increment a child counter $D_m$, as shown in FIG. 4, the same checks must be performed as for a child counter read. The signature must be verified 410. If the signature is verified successfully 420, the actual parent counter value is compared to the stored parent counter value 430. If the signature is not verified successfully, the child counter increment fails 440. If the actual parent counter value is not equal to the parent stored counter value 450, then the child counter increment fails 440.

If the actual parent counter value is equal to the stored parent counter value 450, then the stored child counter $D_m$ is valid. The value of the counter value $D_m$ is then incremented 460. The value of the parent counter C is incremented 470. The new value of child counter $D_m$, the old value of any other child counters ($D_1$ through $D_{m-1}$ and $D_{m+1}$ through $D_n$) and new value of the parent counter C are signed 480.

Adding a New Counter Value

In order to add a new child counter, the signature and stored parent counter value are checked. If no tampering is detected, the parent counter value is incremented. The new child counter is stored with the previously existing child counters and the parent counter value. A file storing the parent and child counter values is then signed. A counter value may be deleted in the same way.

As described above, in one embodiment of the invention, a number of files may be used, each storing one or more child counter values, parent counter value, and signature. If a certain file comprises only one child counter value, that child counter may be deleted by deleting that certain file. According to another embodiment of the invention, a counter may be created by creating a new child counter value, concatenating it with the current counter value, and signing the resulting concatenation.

Conclusion

Herein a system and method for multiplexed secure counters. As mentioned above, while exemplary embodiments of the present invention have been described in connection with various computing devices and network architectures, the underlying concepts may be applied to any computing device or system in which it is desirable to use multiple secure counters. Thus, the techniques for to using multiple secure counters in accordance with the present invention may be applied to a variety of applications and devices. For instance, the techniques of the invention may be applied to the operating system of a computing device, provided as a separate object on the device, as part of another object, as a downloadable object from a server, as a "middle man" between a device or object and the network, as a distributed object, etc. While exemplary names and examples are chosen herein as representative of various choices, these names and examples are not intended to be limiting.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the techniques of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for securing digital content in a computer system, the method comprising:

implementing, in the computer system, a first level counter, where a first-level counter provides a first-level counter value, where said first-level counter provides an operation to increment the value of said first-level counter;

implementing, in the computer system, a second-level counter associated with a digital content file, where the second-level counter provides a second-level counter value and where the second-level counter provides an operation to increment the value of the second-level counter, the operation to increment the value of the second-level counter triggering the operation to increment the value of the first-level counter, and where data comprising a first-level counter value and said at least one second-level counter value are stored together in at least one file with verification information for said data;

receiving a request to read the value of the second-level counter;

authenticating the verification information for said data;

comparing the current value of the first-level counter to the first-level counter value stored in said at least one file; and returning the value for said at least one second-level counter, when the current value of the first-level counter is equal to the first-level counter value stored in said at least one file.

2. The method of claim 1, where a trusted entity can sign data with a verifiable signature, and where said verification information for data comprises a signature from said trusted entity of said data.

3. The method of claim 2, where said authenticating the verification information for said data comprises:

verifying said signature.

4. The method of claim 1, where said authenticating the verification information for said data comprises:

returning an error message if said verification of the security of said at least one file is unsuccessful.

5. A method for securing digital content in a computer system, the method comprising:

implementing, in the computer system, a first level counter, where a first-level counter provides a first-level counter value, where said first-level counter provides an operation to increment the value of said first-level counter;

implementing, in the computer system, a second-level counter associated with a digital content file, where the second-level counter provides a second-level counter value and where the second-level counter provides an operation to increment the value of the second-level counter, and where data comprising a first-level counter value and said second-level counter value are stored together in at least one file with verification information for said data;

determining that the digital content file was accessed;

authenticating the verification information for said data;

comparing the current value of the first level counter to the first-level counter value stored in said at least one value;

incrementing the value for said second-level counter;

incrementing the value for said first-level counter; and storing data comprising said first-level counter and said incremented second-level counter value together with verification information for said data in said at least one file.

6. The method of claim 5, where a trusted entity can sign data with a verifiable signature, and where said verification information for data comprises a signature from said trusted entity of said data.

7. The method of claim 6, where said authenticating the verification information for said data comprises:

verifying said signature.

8. The method of claim 6, where said authenticating the verification information for said data comprises:

returning an error message if said verification of the security of said at least one file is unsuccessful.

9. A method for securing digital content in a computer system, the method comprising:

implementing, in the computer system, a first level counter, where a first-level counter provides a first-level counter value, where said first-level counter provides an operation to increment the value of said first-level counter;

implementing, in the computer system, a second-level counter associated with a digital content file, where the second-level counter provides a second-level counter value and where the second-level counter provides an operation to increment the value of the second-level counter, and where data comprising a first-level counter value and said second-level counter value are stored together in at least one file with verification information for said data;

receiving a request to add a new second-level counter associated with a second digital content file;

authenticating the verification information for said data;

comparing the current value of the first-level counter to the first-level counter value stored in said at least one file;

generating a new second-level counter and incrementing the new second-level counter;

incrementing the first-level counter; and storing data comprising said first-level counter value, the second-level counter value and said new second-level counter together with verification information in said at least one file.

10. A system for implementing at least one second-level counter, where a first-level counter provides a first-level counter value, where said first-level counter provides an operation to increment the value of said first-level counter but does not provide an operation to set said first-level counter to an arbitrary value, said system comprising:

means for storing data comprising said first-level counter value and said at least one second-level counter together with verification information for said data in at least one file;

means for responding to a read command for a specific one of said at least one second-level counters by verifying the security of said at least one file and returning a value for said at least one second-level counter, wherein verifying the security of said at least one file includes verifying that said stored first-level counter value corresponds to the current value of said first-level counter; and means for responding to an increment command for a specific one of said at least one second-level counters by verifying the security of said at least one file; incrementing a value for said specific second-level counter; incrementing a value for said at least one first-level counter; and storing data comprising said first-level counter and said incremented specific second-level counter value together with verification information for said data in said at least one file.

11. The system of claim 10, where a trusted entity can sign data with a verifiable signature, and where said verification information for data comprises a signature from said trusted entity of said data.

12. The system of claim 11, where said means for verifying the security of said at least one file comprises:
means for verifying said signature.

13. The system of claim 10, where said means for verifying the security of said at least one file comprises:
means for returning an error message if said verification of the security of said at least one file is unsuccessful.

14. The system of claim 10, where said means for incrementing of said at least one first-level counter comprises means for adding one to said first-level counter.

15. The system of claim 10, where said at least one file comprises one file for each of said at least one second-level counter.

16. The system of claim 10, further comprising:
means for responding to a request to add a new second-level counter by storing data comprising said first-level counter value and said new second-level counter together with verification information in said at least one file.

17. The system of claim 16, where said means for responding to a request to add a new second-level counter comprises:
means for incrementing said value for said first-level counter value; and
means for storing data comprising said incremented first-level counter value and said new second-level counter together with verification information in said at least one file.

18. A computer storage media for implementing at least one second-level counter, where a first-level counter provides a first-level counter value, where said first-level counter provides an operation to increment the value of said first-level counter but does not provide an operation to set said first-level counter to an arbitrary value, said medium with instructions to perform acts comprising:
storing data comprising said first-level counter value and said at least one second-level counter together with verification information for said data in at least one file;
responding to a read command for a specific one of said at least one second-level counters by verifying the security of said at least one file and returning a value for said at least one second-level counter, wherein verifying the security of said at least one file includes verifying that said stored first-level counter value corresponds to the current value of said first-level counter; and
responding to an increment command for a specific one of said at least one second-level counters by verifying the security of said at least one file; incrementing a value for said specific second-level counter; incrementing a value for said at least one first-level counter; and storing data comprising said first-level counter and said incremented specific second-level counter value together with verification information for said data in said at least one file.

19. The computer storage media of claim 18, where a trusted entity can sign data with a verifiable signature, and where said verification information for data comprises a signature from said trusted entity of said data.

20. The computer storage media of claim 19, where said verification of security of said at least one file comprises: verifying said signature.

21. The computer storage media of claim 18, where said verification of the security of said at least one file comprises:
returning an error message if said verification of the security of said at least one file is unsuccessful.

22. The computer storage media of claim 18, where said at least file comprises one file for each of said at least one second-level counter.

23. The computer storage media of claim 18, said acts further comprising:
responding to a request to add a new second-level counter by storing data comprising said first-level counter value and said new second-level counter together with verification information in said at least one file.

24. The computer storage media of claim 23, where response to a request to add a new second-level counter comprises:
incrementing said value for said first-level counter value; and
storing data comprising said incremented first-level counter value and said new second-level counter together with verification information in said at least one file.

* * * * *